United States Patent [19]
Wilcoxson et al.

[11] Patent Number: 6,150,977
[45] Date of Patent: Nov. 21, 2000

[54] METHOD FOR ENHANCING THE PERFORMANCE OF A SATELLITE COMMUNICATIONS SYSTEM USING MULTIBEAM ANTENNAS

[75] Inventors: Donald C. Wilcoxson, Redondo Beach; Eldad Perahia, Hermosa Beach, both of Calif.

[73] Assignee: TRW Inc., Redondo Beach, Calif.

[21] Appl. No.: 09/183,273

[22] Filed: Oct. 30, 1998

[51] Int. Cl.[7] .............................. H04B 7/185; H01Q 3/00
[52] U.S. Cl. ......................... 342/355; 342/354; 342/359
[58] Field of Search .................................... 342/355, 354, 342/359, 352; 455/427, 429, 430

[56] References Cited

U.S. PATENT DOCUMENTS

| | | |
|---|---|---|
| 4,599,619 | 7/1986 | Keigler et al. . |
| 4,630,058 | 12/1986 | Brown . |
| 4,910,524 | 3/1990 | Young et al. . |
| 5,697,050 | 12/1997 | Wiedman . |

*Primary Examiner*—Thomas H. Tarcza
*Assistant Examiner*—Fred Mull
*Attorney, Agent, or Firm*—Michael S. Yatsko

[57] ABSTRACT

The present invention provides a method for determining antenna pointing error of a satellite antenna (702–716) that produces at least one spot beam having a corresponding gain pattern. The method obtains from a first unique location (510) on the ground a first measurement of a spot beam strength for a first cell (502). Similar measurements are obtained at second and third unique locations (512, 514). Attitude component errors, for example the roll or pitch attitude component errors may then be determined. The method may further determine a yaw attitude component error based on fourth, fifth, and sixth measurements of spot beam strength made from unique locations (616–620) in a second cell (604) also generated by the antenna. Additional measurements may be collected in each beam at unique locations (510–514, 516–520, 610–614, 616–620) and averaged to reduce the temporary or zero means effects of rain, scintillation, or other atmospheric conditions on the spot beam strength. Furthermore, the method may transmit any of the measurements to a central processor (422) which determines the attitude component errors based on the measurements.

20 Claims, 6 Drawing Sheets

METHOD FOR ENHANCING THE PERFORMANCE OF A SATELLITE COMMUNICATIONS SYSTEM USING MULTIBEAM ANTENNAS

BACKGROUND OF THE INVENTION

The present invention relates to satellite communications systems. In particular, the present invention relates to satellite spot beam pointing and ground station measurements that determine satellite and antenna pointing error.

Satellites have long been used to provide communications capabilities on a global scale. Typically, a modern communications satellite includes multiple downlink antennas, each of which provides communications bandwidth to a large coverage area (or "footprint") using multiple downlink spot beams. Modern satellite antennas operate at much higher carrier frequencies than those in previous systems. Thus, for example, modern satellites may use Ka-band frequency uplinks (at approximately 30 GHz) and downlinks (at approximately 20 GHz), while previous satellites used Ku- or C-Band frequency uplinks and downlinks (approximately 3–12 GHz).

Ka-band frequency downlinks generate relatively small spot beams on the surface of the Earth, and the area each covers is commonly referred to as a "ground cell", or simply a "cell". Transmitted by a geosynchronous satellite, the diameter of Ka-band cell may be only 300–400 miles in diameter (as measured between points in the spot beam where the antenna gain is minimally acceptable, e.g., −5 or −6 dB, relative to the peak antenna gain at the center of the spot beam). Thus, a large number of spot beams may be required to cover a large land mass.

For administration purposes, the satellite and satellite antennas are pointed such that each of the spot beams, preferably, remains fixed over the same portion of the Earth. Thus, for example, a satellite which transits local programming (such as local television) is expected to transmit the local programming to the same cell appropriate for the programming. In order for the local programming to remain local, it is not acceptable for the spot beam to move into a different cell. Maintaining the correct satellite pointing, however, is a difficult task.

Three parameters (attitude components) are generally considered to determine the pointing of a satellite: roll, pitch, and yaw. Typically, the roll axis is defined to be in the direction of the satellite velocity vector and is in the plane of the orbit. The pitch is defined as an axis perpendicular to the roll axis and the orbit plane. Finally, the yaw axis is perpendicular to each of the roll and pitch axis and is in the plane of the orbit. Rotations about the yaw axis may therefore rotate the downlink spot beams about the yaw axis, while rotations about the roll and pitch axes produce movements in the downlink spot beams perpendicular to the velocity vector or parallel to the velocity vector, respectively.

The gravitational influence of the moon, heating and cooling effects (particularly as the satellite is alternately exposed and hidden from the sun), and imperfections in the satellite attitude control system are only three of the many causes of error in the desired satellite pointing. Even slight errors in pointing create enormous differences in spot beam strength between the desired pointing and the erroneous pointing. As an example, a user located only 0.4 degrees from the antenna beam boresight experiences a 4 dB (more than half power) loss of spot beam strength when the satellite pointing is in error by as little as 0.1 degree.

In the past, several attempts have been made to detect and correct satellite pointing error. In U.S. Pat. No. 4,630,058, entitled "Satellite communication system" to Brown, ground stations participate in the detection of pointing error. The ground stations in Brown measure the strength of a beacon signal as transmitted by the satellite's regular communication antenna and as transmitted by a special beacon antenna. The beacon antenna is designed to provide a broader, overlapping, radiation pattern compared to the regular communication antenna.

The ground stations are located near the fringes of the coverage area provided by the regular communication antenna (where the strength of the coverage area falls off rapidly) and are therefore sensitive to pointing error. The pointing error typically causes significant changes in the measured beacon signal as transmitted by the regular communication antenna, while the beacon signal produced by the broader coverage area beacon antenna does not vary nearly as much. By determining the ratio of the measured beacon signals, the degree of pointing error may be determined in two dimensions (generally corresponding to roll and pitch attitude components) assuming that the coverage area gain pattern is known. Appropriate correction signal may then be relayed to the satellite.

Brown, however, is a very complex system. The satellite, in addition to its normal payload, requires additional antenna equipment, switching circuitry and control, and power capacity. Given the expense of launching a satellite, and the need to pack as much revenue producing dedicated communications circuitry onboard as possible, the Brown system tends to be impractical to implement (and further provides no indication of the yaw angle error).

A second attempt at correcting antenna pointing error is disclosed in U.S. Pat. No. 4,910,524, entitled "Investigating and Controlling the Pointing Direction of an Antenna on Board a Spacecraft", to Young et al. In Young, ground stations, located at the fringes of the coverage area produced by the satellite, measure the strength of the RF transmissions in the coverage area. Oscillations in the satellite pointing are deliberately introduced to vary the strength of the RF transmission at the fringes of the coverage area in a predictable manner. Correlating the changes in measured oscillation with the known coverage area gain pattern allows determination of pointing error.

Young, however, requires the satellite to provide a mechanism for causing the spacecraft or the antenna to undergo oscillatory movement. Tremendous complexity is thereby added to the satellite. Generally, the cost of the satellite is correspondingly increased and its reliability decreased.

A third example of an attempt to correct pointing error is shown in U.S. Pat. No. 5,697,050, entitled "Satellite Beam Steering Reference Using Terrestrial Beam Steering Terminals" to Wiedeman. Wiedeman requires at least one reference transmitter on the ground which sends a signal to a reception antenna on board the satellite. The satellite, in bent pipe fashion, relays the signal to a ground station. The ground station determines the gain in the signal and compares the gain to a predetermined gain pattern of the reception antenna. The difference in the actual signal gain and the gain predicted by the gain pattern is used to derive the attitude error of the satellite.

Thus, Wiedeman does not directly correct for pointing errors in the downlink antenna coverage area. Rather, the pointing error corrected for is related to the uplink antenna gain pattern. Additionally, Wiedeman requires reference transmitters (of which there may be several) to consume precious uplink bandwidth by transmitting signals to the satellite. Similarly, the satellite is required to consume precious downlink bandwidth by relaying the signal to a ground station.

A need has long existed in the industry for a method for detecting and correcting satellite spot beam pointing, without requiring elaborate on-board satellite hardware or complex ground measurement equipment.

BRIEF SUMMARY OF THE INVENTION

It is an object of the present invention to determine satellite and antenna pointing errors.

It is another object of the present invention to correct satellite and antenna pointing errors.

A further object of the present invention is to determine the roll, pitch, and yaw attitude component pointing errors of a satellite and satellite antenna.

Yet another object of the present invention is to determine and correct satellite and antenna pointing errors without significantly increasing the complexity of a satellite.

A further object of the present invention is to determine and correct satellite and antenna pointing errors without unduly consuming available uplink and downlink bandwidth.

A still further object of the present invention is to determine and correct satellite and antenna pointing errors without using additional signals such as beacon signals.

The present invention provides a method for determining antenna pointing error of a satellite antenna that produces numerous spot beams having corresponding gain patterns. The spot beams are maintained at a substantially fixed location. In other words, they are not intentionally varied to produce measurable oscillations in coverage strength, but may experience minor perturbations in position due to external mechanical or environmental influences. The method obtains from a first unique location on the ground a first measurement of a spot beam strength for a first cell. Similar measurements are obtained at second and third unique locations. Having obtained the measurements, the method proceeds to determine roll attitude component error, pitch attitude component error, or, typically, both component errors based on the first, second, and third measurements.

The method may further determine a yaw component error based on additional measurements and a determination of the roll and pitch components. To determine the yaw component error, fourth, fifth, and sixth measurements of spot beam strength are made from unique locations in a second cell also generated by the antenna.

Additional measurements may be collected at each unique location and averaged to reduce the temporary or zero means effects of rain, scintillation, or other atmospheric conditions on the spot beam strength. Furthermore, the method may transmit any of the measurements to a central processor which determines the attitude component errors based on the measurements. Any errors in satellite (or antenna) pointing may be corrected by transmitting to the satellite pointing corrections including yaw, pitch, and roll corrections. The corrections may apply to the satellite as a whole, or to each of the multiple antennas individually if separate roll, pitch, and yaw errors are determined for each antenna.

The measurements may be taken or reported at predetermined intervals, for example, hourly or semi-daily. Furthermore, the measurements may indicate simply an increase or decrease from a previously measured spot beam strength. The measurements may further indicate, when reported, that the spot beam strength has changed by more than a predetermined threshold.

In another embodiment of the present invention, first, second, and third measurement ground stations are established in unique locations near the expected periphery of a first cell. The method then obtains a first measurement of a spot beam strength for the first cell at the first ground station, second ground station, and third ground station. At least the roll and pitch attitude component errors may then be calculated based on the first, second, and third measurements. Preferably, the ground stations are located at unique triple points that allow the ground stations to measure the strength of spot beams for three different cells from the same location.

DETAILED DESCRIPTION OF THE INVENTION

Figure 1:
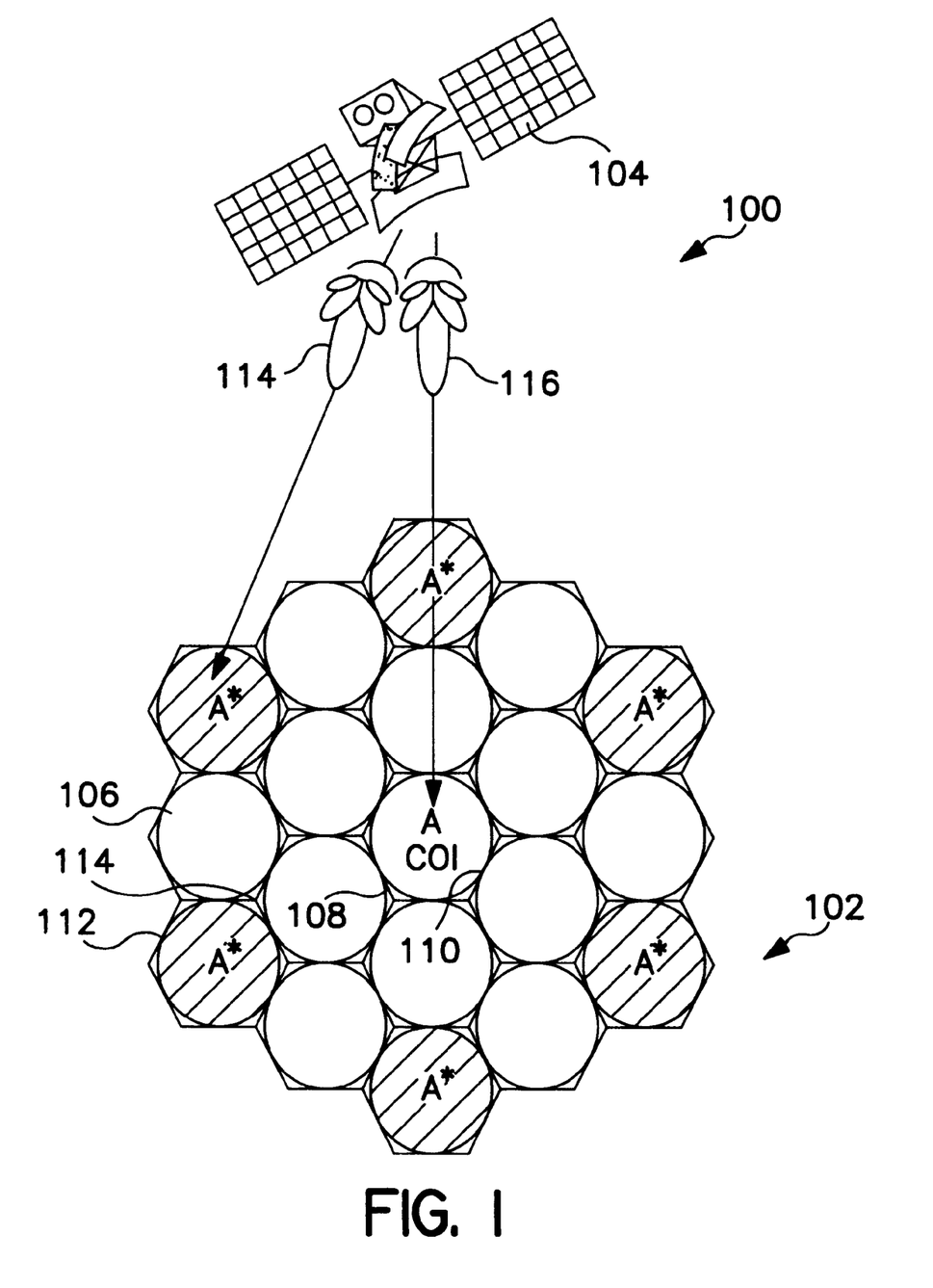
FIG. 1 illustrates frequency reuse in a cellular satellite communications system.

Turning now to the drawings, FIG. 1 illustrates a satellite cellular communication system 100 including a frequency reuse plan 102 generated by a satellite 104. The frequency reuse plan 102 may make use of multiple frequencies and polarizations (for example, frequency/polarization A and A* in FIG. 1) to reduce interference between cells. The reuse plan 102 includes multiple cells 106–112, for example, that correspond to spot beams separately produced by the satellite 104. FIG. 1 also shows a triple point 114, which is located approximately at the intersection of the equal gain boundaries of three adjacent cells. In this instance, the triple point 114 is associated with cells 106, 108, and 112.

As noted above, a cell is typically defined by a diameter corresponding to the distance between two points where the antenna gain or spot beam strength drops below a predetermined threshold, for example 5 dB. Each spot beam has a corresponding gain pattern related to its transmit lobe pattern which is determined by many factors, including antenna design and transmit power levels. Two simplified lobe patterns 114 and 116 are shown in FIG. 1. Typically, the lobe pattern has a centrally located maximum and rapidly falls off in gain to either side.

The gain pattern of a spot beam determines the variation in spot beam strength over the cell. Typically, the center of a cell is exposed to the greatest level of spot beam energy (principally because antenna pointing results in the lobe pattern being centered around the desired center of each cell). The spot beam strength at the edges of a cell differ by as much as 5 or 6 dB from the center of the cell, and slight variations in pointing error affect the spot beam strength at the edges much more than the spot beam strength at the center of the cell. The gain pattern for each spot beam may be determined, for example, by mathematical modeling, laboratory measurement before launch, or direct measurement after launch. As will be explained below, knowledge of the gain pattern is used to determine pointing error in the satellite 104.

Figure 2:
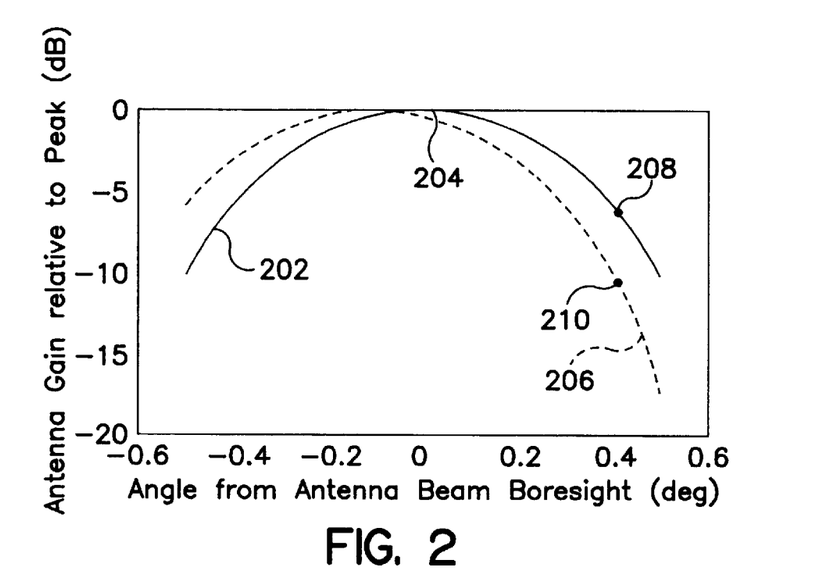
FIG. 2 shows the difference in received gain for a correctly pointed satellite spot beam and a satellite spot beam with a small amount of pointing error.

Turning now to FIG. 2, one example of the effect of pointing error on spot beam strength is shown. FIG. 2 plots the angle from the antenna beam boresight (i.e., the center of the antenna beam) against the antenna gain relative to the peak gain produced by the antenna. As noted above, the gain and corresponding spot beam strength rapidly drops off to either side of the center of the spot beam.

The desired curve 202, may for example, represent the strength of the spot beam across a cell when the spot beam is correctly centered on the cell. Thus, in the center of the cell (zero degrees offset from the boresight) the received spot beam strength is at a desired maximum 204. Even slight satellite antenna pointing errors can cause significant changes in the spot beam strength across a cell. Consider, for example, the error curve 206 and a ground station located 0.4 degrees from the cell or antenna boresight center. The error curve 206 represents an antenna pointing error of only 0.1 degrees. The desired spot beam strength, point 208, is approximately 7 dB below maximum (0 dB), while the actual spot beam strength due to the pointing error, point 210, is significantly reduced to 11 dB below maximum.

Figure 3:
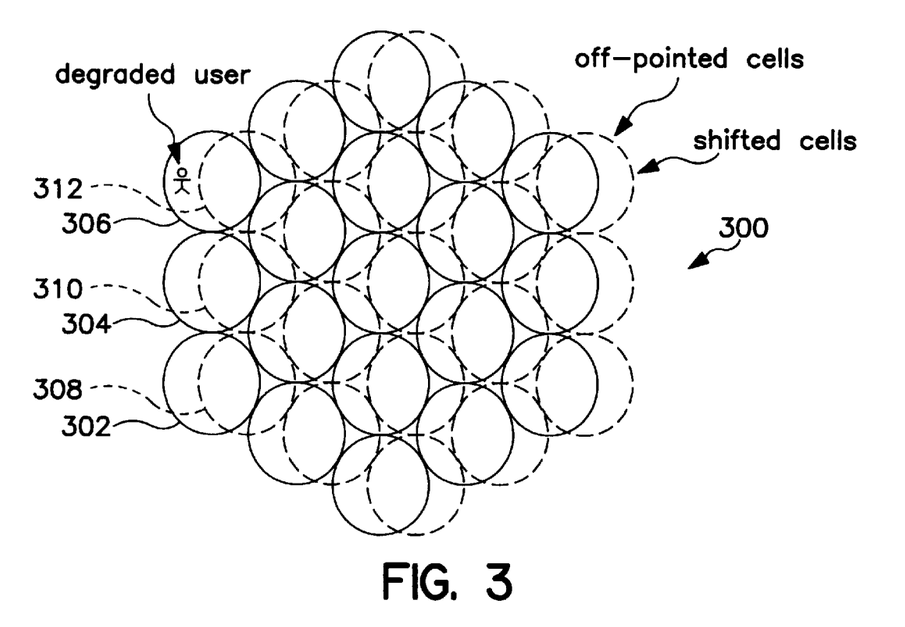
FIG. 3 depicts the effects of pointing error on the pattern of spot beams generated by the satellite.

As illustrated in FIG. 3, the effect of antenna pointing error is shown on a cellular system 300 including multiple spot beams which may be generated by one or more satellite antennas. The cells outlined with solid lines (for example, cells 302, 304, and 306) indicate the desired or expected location of the cells in the system. However, antenna pointing error has caused the spot beams to shift from the their desired locations (covering cells 302, 304, and 306) to correspond to the undesired cells 308, 310, and 312. Thus, every user in the cellular system 300 (and in nearby cellular systems, perhaps generated by other antennas on the same or other satellites) experiences the effects of antenna pointing error. The effects may include significant changes in gain, interference, and the like and can easily make an otherwise acceptably performing system into an unacceptably performing system.

Figure 4:
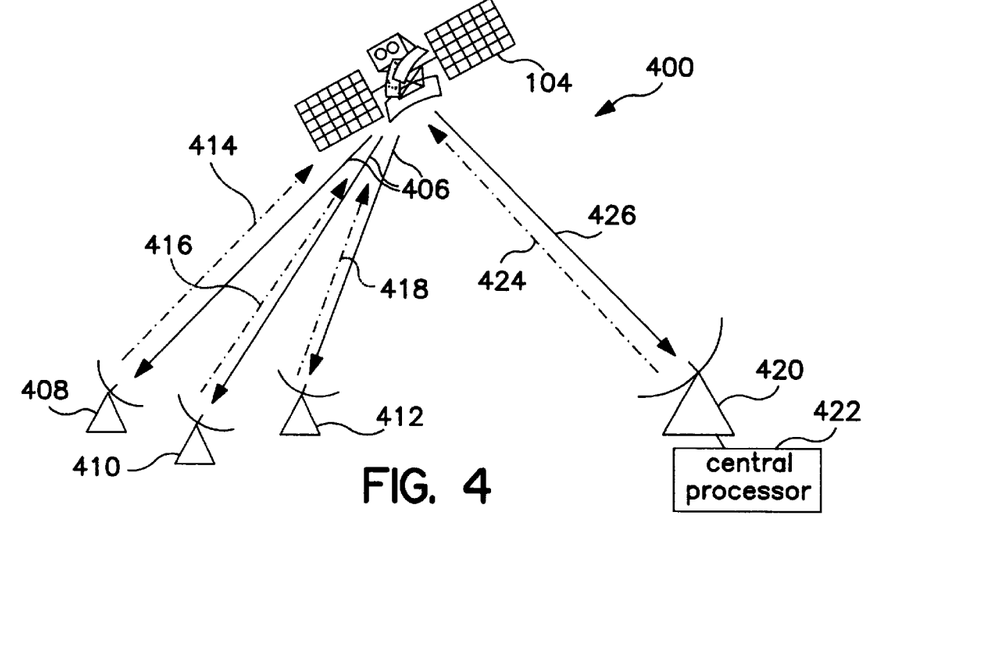
FIG. 4 illustrates a satellite in bi-directional communication with ground stations and a central processor.

Turning to FIG. 4, that figure shows the resources 400 that are available to help determine and correct antenna pointing error. The resources include the satellite 104, which transmits at least one spot beam 406 to the ground stations 408, 410, and 412. The ground stations also communicate with the satellite 404 through the uplink channels 414, 416, and 418. Additionally, a central station 420 (which may be a network operations and control center or the like) is present and typically includes a relatively powerful central processor 422. The central station 420 is in communication with the satellite 104 via the central uplink 424 and central downlink 426. Additionally, a ground based network (not shown), for example TDM trunk lines, may connect the ground stations 408–412 and the central station 420.

Figure 5:
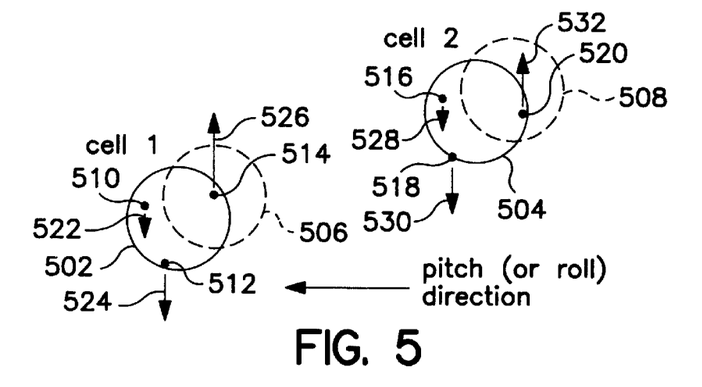
FIG. 5 depicts the effect of pointing error on two cells and includes sets of ground stations in each cell for measuring the strength of the spot beam in each cell.

FIG. 5 shows another example of the effects of antenna pointing error. The expected periphery (5 dB from maximum gain) of the first expected cell 502 and the second expected cell 504 are shown in solid lines. FIG. 5 also shows the cells 502 and 504 as shifted by antenna pointing error as the first error cell 506 and the second error cell 508. A first set of three ground stations 510, 512, and 514 are illustrated and are preferably positioned in unique locations near the periphery of the first expected cell 502. Similarly, a second set of three ground stations 516, 518, and 520 are illustrated in position in unique locations near the periphery of the second expected cell 504. Although not required, the ground stations 510–520 are preferably spaced equidistantly from one another around the periphery of the cells 502, 504. The arrows 522–532 illustrate the change in spot beam strength at each ground station 510–520 due to the antenna pointing error.

The first and second error cells 506, 508 show the shift in spot beam strength away from the ground stations 510, 512, 516, and 518, and toward the ground stations 514 and 516. The ground stations 510, 512, 516, and 518 (as illustrated by the arrows 522, 524, 528, and 530) therefore measure a decrease in the spot beam strength. The ground stations 512 and 518 measure a greater decrease because the antenna pointing error moves the spot beams farther from the ground stations 512 and 518 than from the ground stations 510 and 516.

On the other hand, the antenna pointing error moves the spot beams to more centrally cover the ground stations 514 and 520. Thus, the ground stations 514 and 520 measure significant increases in the spot beam strength. As will be discussed in more detail below, the spot beam strength measurements may be used to calculate attitude component errors.

In general, pitch and roll attitude component errors may be considered to cause linear shifts in the location of spot beam patterns. Thus, as noted above, changes in the satellite or antenna pitch move the spot beams parallel to the direction of satellite motion, while changes in the satellite or antenna roll move the spot beams perpendicular to the direction of satellite motion. With a minimum of three measurements in a single cell (for example, measurements obtained by the ground stations 510–514), and knowledge of the antenna gain pattern, the pitch and roll attitude component errors can be determined.

Figure 8:
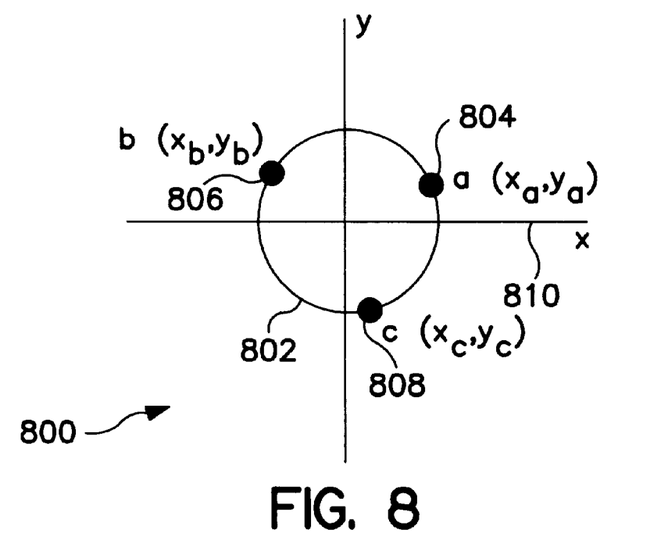
FIG. 8 shows a two dimensional cut from an antenna gain pattern and three ground stations located in the gain pattern.

The discussion of the roll and pitch attitude component error determination below proceeds with reference to FIGS. 8 and 9. FIG. 8 depicts a cell 800 including a gain pattern 802, first, second, and third ground stations 804–808, and an xy (Cartesian) reference frame 810. The first, second, and third ground stations 804–808 are located at $(x_a, y_a)$, $(x_b, y_b)$, $(x_c, y_c)$, respectively in the xy reference frame 810.

Figure 9:
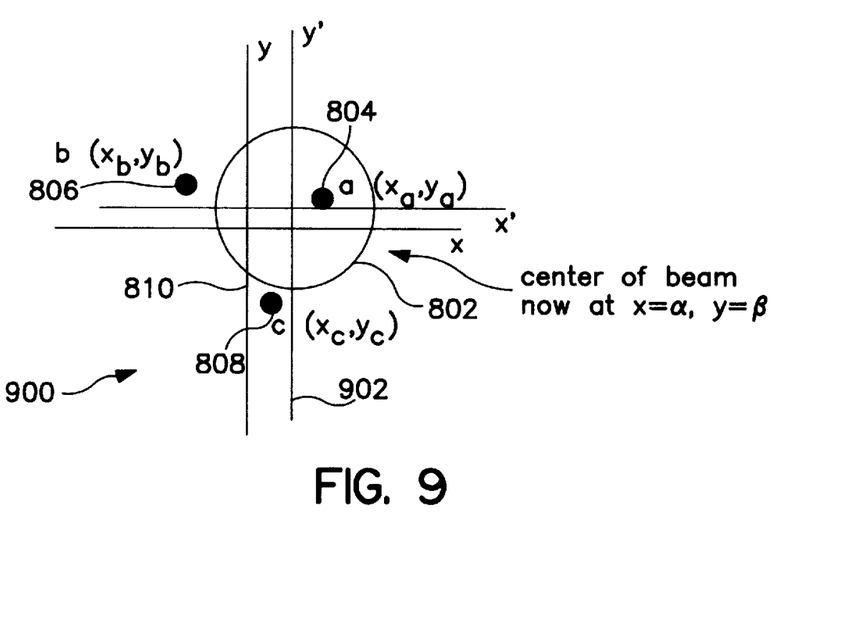
FIG. 9 depicts the gain contour of FIG. 8 shifted due to antenna (or satellite) pointing error.

FIG. 9 depicts a cell 900 showing the gain pattern 802 shifted by antenna pointing error. The first, second, and third ground stations 804–808 are again illustrated in FIG. 9. The antenna pointing error has shifted the gain pattern 802 to a new location centered at reference frame 902 (as opposed to the original location at the center of reference frame 802).

As noted above, the antenna gain pattern for each ground cell may be determined, for example, before or after launch. The antenna pattern may be denoted G(x,y), where x and y refer to the Cartesian coordinates (in any convenient units, including miles, kilometers, or feet, for example), relative to the center of the cell 802 (i.e., x=0, y=0). FIG. 8 shows the nominal locations of the first, second, and third ground stations at $(x_a, y_a)$, $(x_b, y_b)$, $(x_c, y_c)$, respectively. The received power at each of the ground stations is given by:

$$r_a = P_T L_P G(x_a, y_a) g_{term}$$

$$r_b = P_T L_P G(x_b, y_b) g_{term}$$

$$r_c = P_T L_P G(x_c, y_c) g_{term}$$

where $P_T$ represents the satellite transmitter power, $L_P$ represents the propagation loss (e.g., between the antenna and the ground station), and $g_{term}$ represents the terminal antenna gain in the direction of the satellite. Each of the parameters noted above (including $G(x_i, y_i)$) are all known or may be determined before or after launch.

When the satellite antenna is mispointed, $G(x_i, y_i)$ changes, allowing the roll and pitch attitude component errors to be determined. With reference to FIG. 9, the antenna pattern 802 is shifted by $\alpha$ in the x direction and $\beta$ in the y direction and is considered centered at x'=0, y'=0. The received power at each ground station is now given by:

$$r'_a = P_T L_P G(x_a - \alpha, y_a - \beta) g_{term}$$

$$r'_b = P_T L_P G(x_b - \alpha, y_b - \beta) g_{term}$$

$$r'_c = P_T L_P G(x_c - \alpha, y_c - \beta) g_{term}$$

Because the $r_a$, $r_b$, and $r_c$ are known a priori, and the $r'_a$, $r'_b$, and $r'_c$ may be measured, the remaining unknowns are $\alpha$ and $\beta$. Thus, solving the following series of equations, the antenna pointing error (given in Cartesian coordinates by $\alpha$ and $\beta$) may be determined:

$$(r'_a/r_a)G(x_a, y_a) = G(x_a - \alpha, y_a - \beta)$$

$$(r'_b/r_b)G(x_a, y_a) = G(x_b - \alpha, y_b - \beta)$$

$$(r'_c/r_c)G(x_a, y_a) = G(x_c - \alpha, y_c - \beta)$$

Preferably, the solution is one that minimizes the mean squared error (MSE) for the above equations. Additionally, it should be noted that three measurements are the minimum necessary to uniquely determine ($\alpha$, $\beta$). For example, consider with reference to FIG. 8, a scenario in which the first and second ground stations 804, 806 are located on the x-axis of the reference frame 810. In a situation where, for example, the antenna pointing error was such that the antenna gain at the first ground station did not change, but the antenna gain at the second ground station did change (i.e., a rotation about the first ground station 804), there would be two solutions for a set of two equations. In other words, a rotation in the clockwise and counterclockwise directions would both yield the same received power $r'_b$. Thus, the present invention preferably uses sets of three equations, as discussed above, to uniquely determine ($\alpha$, $\beta$).

It is noted that additional ground stations may be established in a cell to measure the spot beam strength to increase the accuracy of the calculations of attitude component errors. Furthermore, more than one spot beam strength measurement may be taken by each ground station at predetermined intervals (for example, hourly, semi-daily) and the individual measurements may be averaged. The averaged strength measurements help reduce the effect of temporary atmospheric conditions on the spot beam strength measurements (such as rain and scintillation), and also help eliminate more persistent zero mean atmospheric effects or, for example, random measurement noise.

It is further noted that the spot beam strength measurements may be transmitted to the central station 420 (or any other central processor) which performs the attitude component error calculations. Thus, the ground stations 408–412, and 510–520 need not include unduly complicated or powerful processing circuitry, but may instead rely on another entity to perform the attitude component error calculations. To minimize traffic (which may flow through a satellite or through a ground based network) between the ground stations 408–412, 510–520 and the central station 420, the ground stations may report changes in spot beam strength simply as increases or decreases that exceed a predetermined threshold. Thus, for example, a single bit may be used in indicate an increase (a 1 value) or a decrease (a 0 value) of more than 0.5 dB, or any other threshold.

Figure 6:
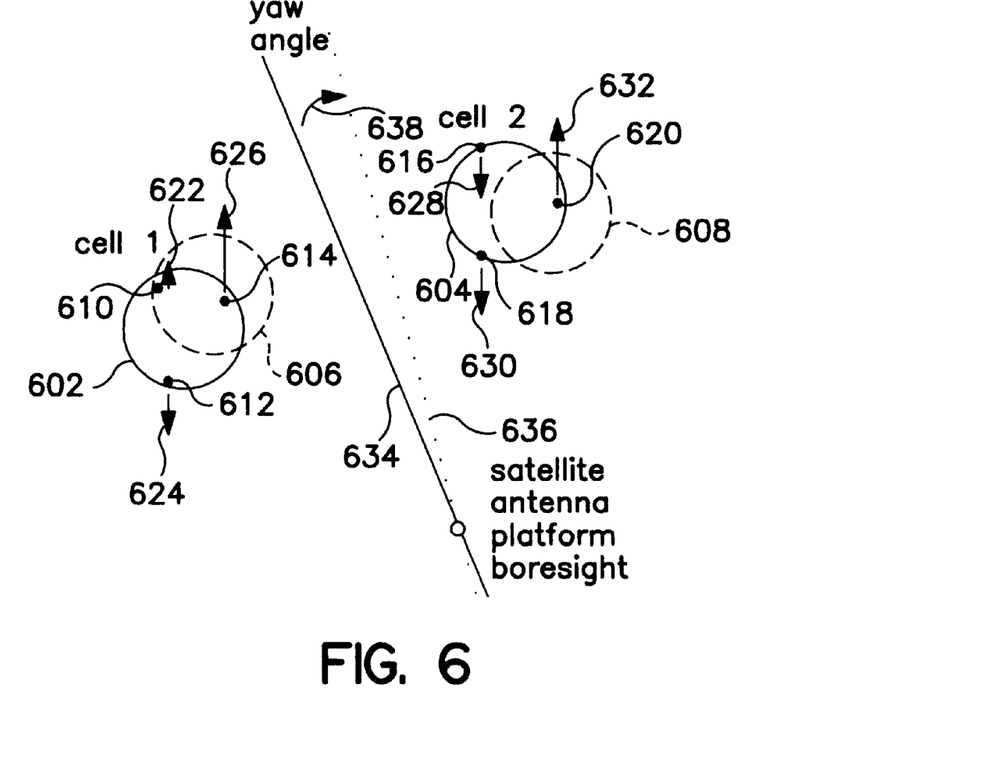
FIG. 6 shows the effect of yaw attitude component error on two cells.

Turning now to FIG. 6, that figure illustrates the determination of a yaw attitude component error. As noted above, changes in the yaw angle of a satellite or antenna cause rotations (rather than linear movement) of the beam pattern around the yaw axis of the satellite. FIG. 6 shows a first and second expected cell 602 and 604 (the 5 dB boundaries are in solid lines) as well as first and second error cells 606 and 608 (dashed lines) caused by yaw attitude component error. Also illustrated are a set of three ground stations 610, 612, and 614 in unique locations in the first expected cell 602 and a second set of three ground stations 616, 618, and 620 in unique locations in the second expected cell 604.

The arrows 622–632 in FIG. 6 illustrate the change in measured spot beam strength caused by the shift in the spot beam as a result of the yaw attitude component area. FIG. 6 shows the expected yaw axis 634, the error yaw axis 636, and the corresponding yaw angle error 638. The ground stations 622–632 measure the spot beam strength as noted above with respect to FIG. 5. The same measurement techniques may be used, including periodic sampling, averaging, thresholding, and transmission of measurements to a central station. Preferably, one or more of the ground stations 408–412, 510–520, and 622–632 are located at triple points of the expected cells in order to measure the spot beam strength for three adjacent cells from one location. Once the ground stations 622–632 have obtained measurements of the spot beam strength, the yaw attitude component error may be calculated.

Figure 10:
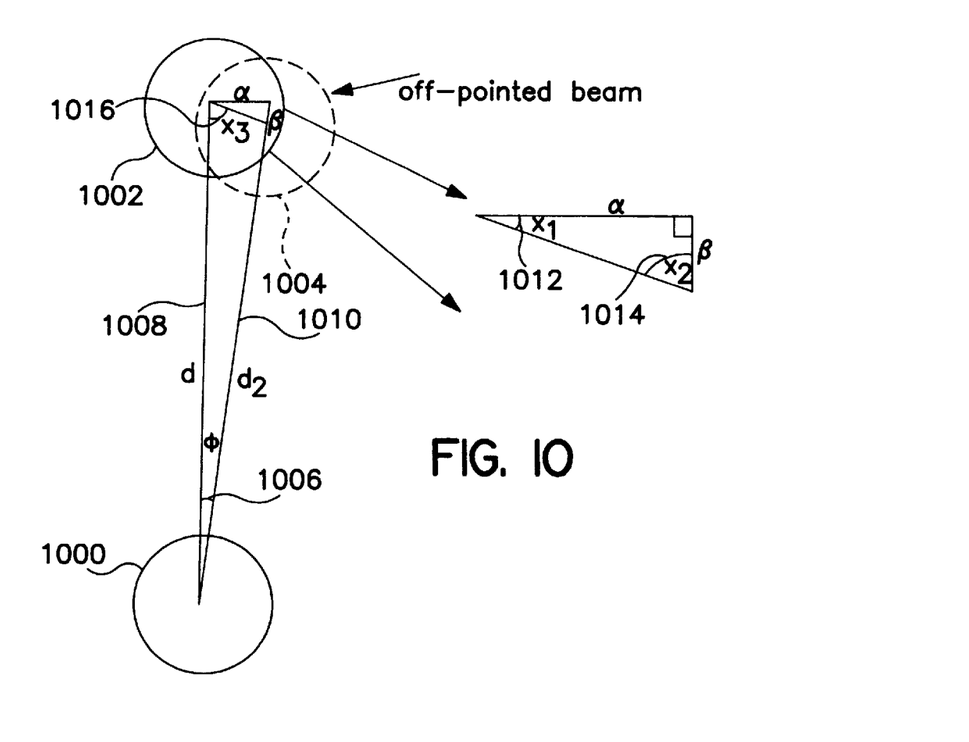
FIG. 10 illustrates the effect of yaw attitude component error and the parameters involved in determining the yaw attitude component error.

The discussion below regarding yaw attitude component error proceeds with reference to a two cell example in FIG. 10. In FIG. 10, a cell 1000 has no relative roll and pitch to a cell 1004, which has a nominal position of 1002. The yaw attitude component error 1006, $\phi$, is illustrated as well as several parameters (distance d 1008, distance d2 1010, angle x1 1012, angle x2 1014, and angle x3 1016) discussed in more detail below.

Measurements in as few as two gain patterns may be used to determine the yaw attitude component error. For example, consider FIG. 1 where one antenna aperture generates all A beams. In the situation where the antenna was rotated about the yaw axis such that the center beam showed no change in its ($\alpha$, $\beta$), but each of the outer beams were rotated (for example) by 30 degrees, then each of the ($\alpha$, $\beta$) for the outer beams would all reflect the same 30 degree rotation. Assume, for example, ($\alpha$, $\beta$)=(0, 0) for one beam, and another beam has an arbitrary ($\alpha$, $\beta$) as in FIG. 10. The distance d 1008 represents the distance from the antenna to the center of the nominal gain pattern 1002, and is a known design parameter. The remaining parameters may then be determined according to:

$$x_1 = \arcsin\left(\frac{\beta}{\sqrt{\alpha^2 + \beta^2}}\right)$$

$$x_2 = \arcsin\left(\frac{\alpha}{\sqrt{\alpha^2 + \beta^2}}\right), \text{ and}$$

-continued $$x_3 = 90° - x_1$$

Furthermore, $$d_2^2 = d^2 + (\sqrt{\alpha^2+\beta^2})^1 - 2d\sqrt{\alpha^2+\beta^2} \cos(x_3)$$

Thus, $$\frac{\sin(\phi)}{\sqrt{\alpha^2+\beta^2}} = \frac{\sin(x_3)}{d_2}, \text{ and}$$

$$\phi = \arcsin\left[\frac{\sqrt{\alpha^2+\beta^2}}{d_2}\sin(x_3)\right]$$

Once the roll, pitch, and yaw attitude component errors, or any subset of them, have been determined, a ground station or the central station 420 may transmit attitude correction to the satellite. Thus, the central station 420 may transmit a roll and pitch attitude correction to the satellite 104, for example. It is noted, however, that the satellite antennas may be mounted rigidly to the satellite, or may be mounted to the satellite with, for example, moveable gimbals.

Thus, the satellite may correct antenna pointing errors by adjusting the attitude of the satellite itself (for example, using momentum wheels, magnetic torque, or thrusters). Additionally or alternatively, the satellite may cause the antenna itself to change in roll, pitch, or yaw by actuating, for example, gimbals on which the antennas are mounted.

When the attitude component errors have been determined, the component error information may be distributed (for example, by the central station 420) to one or more users (for example, ground stations and cellular phones) located in the cellular system. The users may then adjust their operating parameters, including transmit power and error correction coding to compensate for the errors. Thus, for example, a ground station that experiences a 3 dB loss of spot beam strength may compensate by increasing its transmit power by 3 dB or decreasing its data rate by ½. Alternatively, users covered by the spot beam may request that their originating ground station change their coding (for an end-to-end coded or bent pipe system), or request that the satellite change its level of coding on the downlink (for decode-recode systems) to compensate for (or take advantage of) any increase or decrease in spot beam strength.

Figure 7:
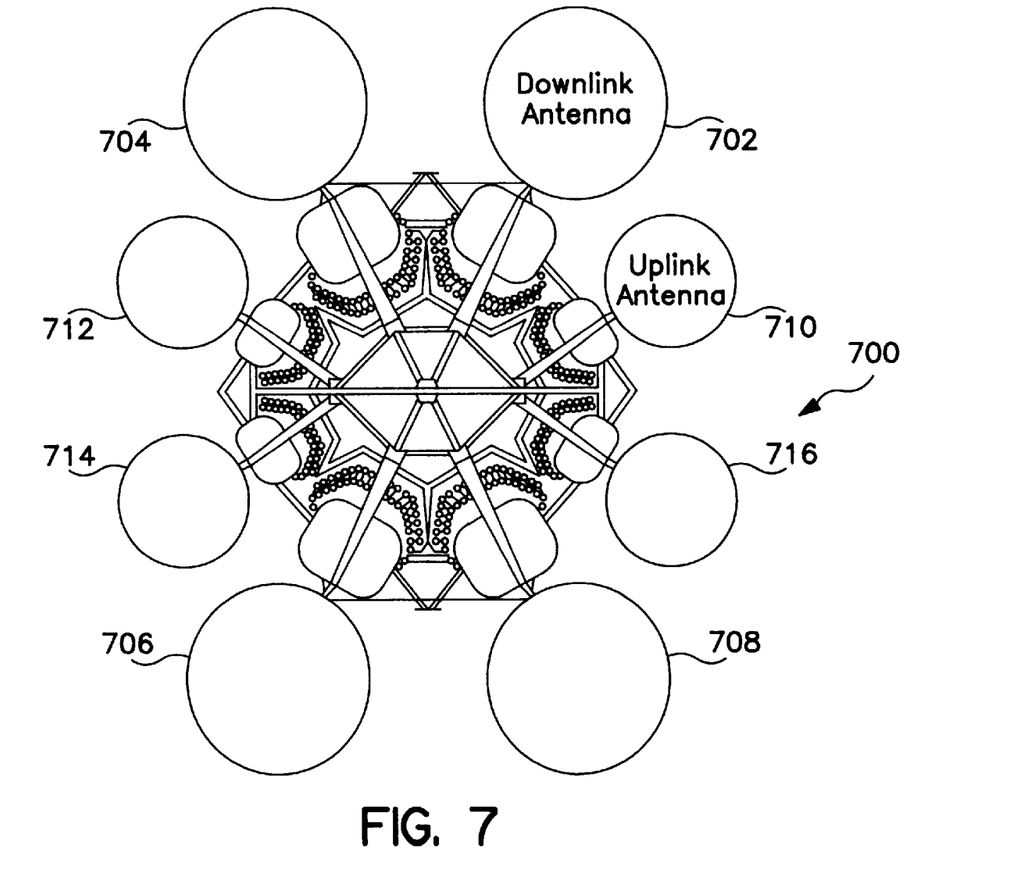
FIG. 7 illustrates one example of the uplink antenna and downlink antenna configuration on a satellite.

It is noted that in many instances, the downlink antennas that generate the spot beams are fixed in a known location with respect to uplink antennas on the satellite. With reference to FIG. 7, a satellite 700 may carry the downlink antennas 702, 704, 706, and 708 which are fixed in location with respect to the uplink antennas 710, 712, 714, and 716. Thus, the determination of the downlink antenna pointing error may also provide an accurate estimate of the uplink antenna pointing direction. This is particularly true when phased array antennas are used.

When the uplink antenna pointing direction cannot be assumed to be directly related to the downlink antenna pointing direction, a signal may be transmitted from the satellite through the uplink antennas and measured at one or more ground stations. When the reciprocity theorem (which states that the transmit and receive antenna patterns are identical) holds, the ground station measurements may be processed as described above with reference to FIGS. 5 and 6 to determine and correct the uplink antenna pointing error.

Numerous advantages directly result from the present invention. Importantly, the present invention does not require any additional hardware on the satellite for measurement of the antenna pointing direction. Similarly, when the locations of the uplink and downlink antennas are highly correlated (as in FIG. 7) no extra hardware is required to determine the pointing of the uplink antennas. No broad beam antennas, beacon signal generators, or satellite oscillation hardware is required. No extra satellite weight or power is required beyond the ordinary communication hardware payload. In fact, the present invention may actually reduce the weight and power required by a satellite because the accurate antenna pointing provided by the invention reduces the amount of overdesign required to accommodate residual pointing error.

Additionally, the ground stations which measure the spot beam strength may be typical user terminals with no special modifications other than to measure received power. The terminals may further be receive only terminals, assuming they can forward their measurements through a ground network to a central station. Furthermore, the invention is equally applicable to multiple relaying techniques, including bent-pipe, full demodulation-remodulation, and full decode-recode techniques.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. A method for determining antenna pointing error of a satellite antenna that produces a plurality of spot beams in a substantially fixed location, said spot beams having corresponding gain patterns, the method comprising the steps of:

obtaining at a first unique location on the ground a first measurement corresponding to spot beam strength of a first spot beam for a first cell, said first spot beam located at a first substantially fixed location;

obtaining at a second unique location on the ground a second measurement corresponding to spot beam strength for said first spot beam for said first cell;

obtaining at a third unique location on the ground a third measurement corresponding to spot beam strength for said first spot beam for said first cell; and determining at least one attitude component error based on said first, second, and third measurements and based on a downlink gain pattern for said first spot beam.

2. The method of claim 1, further comprising the steps of:

obtaining at a fourth unique location on the ground a fourth measurement corresponding to a spot beam strength of a second spot beam for a second cell, said second spot beam located at a second substantially fixed location;

obtaining at a fifth unique location on the ground a fifth measurement corresponding to said spot beam strength of said second spot beam for said second cell;

obtaining at a sixth unique location on the ground a sixth measurement corresponding to said spot beam strength of said second spot beam for said second cell; and determining a yaw attitude component error based on said first, second, third, fourth, fifth, and sixth measurements and on said downlink gain pattern for said first spot beam and on a downlink gain pattern for said second spot beam.

3. The method of claim 2, further comprising the step of transmitting said fourth, fifth, and sixth measurements to a central processor before said determining step.

4. The method of claim 3, further comprising the step of generating at least one additional symbol from said fourth, fifth, and sixth measurements that indicates one of an increase or decrease in said spot beam strength.

5. The method of claim 4, wherein said symbol indicates one of an increase or decrease in said spot beam strength in said second cell beyond a predetermined threshold.

6. The method of claim 2, further comprising the step of transmitting a yaw correction based on said yaw attitude component error to a satellite generating said first cell.

7. The method of claim 2, wherein said step of determining at least one attitude component error comprises determining both a roll attitude component error and a pitch attitude component error, and further comprising the step of transmitting a roll, pitch, and yaw correction to a satellite generating said first cell and said second cell.

8. The method of claim 1, further comprising the step of obtaining at least one additional measurement at each of said unique locations and averaging said additional measurements before said determining step.

9. The method of claim 8, further comprising the step of generating at least one symbol from said first, second, and third measurements that indicates one of an increase or decrease in said spot beam strength.

10. The method of claim 9, wherein said step of generating comprises generating at least one symbol that further indicates one of an increase or decrease in said spot beam strength in said first cell beyond a predetermined threshold.

11. The method of claim 1, further comprising the step of transmitting said first, second, and third measurements to a central processor before said determining step.

12. The method of claim 1, further comprising the step of transmitting at least one attitude correction based on said at least one attitude component error to a satellite generating said first cell.

13. The method of claim 1, wherein said step of determining comprises determining both a roll attitude component error and a pitch attitude component error.

14. A method for determining satellite pointing error of a satellite that produces a plurality of spot beams in substantially fixed locations, said spot beams having corresponding gain patterns, the method comprising the steps of:

establishing at least first, second, and third measurement ground stations in unique locations near an expected periphery of a first cell;

obtaining a first measurement corresponding to a spot beam strength of a first spot beam for said first cell at said first ground station, said spot beam located at a first substantially fixed location;

obtaining a second measurement corresponding to said spot beam strength of said first spot beam for said first cell at said second ground station;

obtaining a third measurement corresponding to said spot beam strength of said first spot beam for said first cell at said third ground station;

determining at least one attitude component error based on said first, second, and third measurements and on a downlink gain pattern of said first spot beam.

15. The method of claim 14, wherein said establishing step comprises establishing said first, second, and third measurement ground stations at unique triple points.

16. The method of claim 14, further comprising the steps of:

additionally establishing a plurality of additional ground stations at unique locations inside an expected location of said first cell;

obtaining additional measurements from said additional ground stations of said spot beam strength for said first cell;

and wherein said determining step comprises determining at least one attitude component error additionally based on said first, second, third, and additional measurements.

17. The method of claim 14, further comprising the steps of:

establishing at least fourth, fifth, and sixth measurement ground stations in unique locations near the expected periphery of a second cell;

obtaining a fourth measurement corresponding to spot beam strength of a second spot beam for said second cell at said fourth ground station, said spot beam located at a second substantially fixed location;

obtaining a fifth measurement corresponding to spot beam strength of said second spot beam for said second cell at said fifth ground station;

obtaining a sixth measurement corresponding to spot beam strength of said second spot beam for said second cell at said sixth ground station;

determining a yaw attitude component error based on said first, second, third, fourth, fifth, and sixth measurements and on said downlink gain pattern for said first spot beam and on a downlink gain pattern for said second spot beam.

18. The method of claim 17, further comprising the step of transmitting said fourth, fifth, and sixth measurements to a central station prior to said determining step.

19. The method of claim 14, further comprising the step of transmitting said first, second, and third measurements to a central station prior to said determining step.

20. The method of claim 14, further comprising the step of transmitting said at least one attitude component error to ground stations covered by said first cell.

* * * * *